US010236927B2

United States Patent
Thiel

(10) Patent No.: US 10,236,927 B2
(45) Date of Patent: Mar. 19, 2019

(54) PROTECTIVE CASE APPARATUS WITH TEMPERATURE-CONTROLLED CHARGING CIRCUIT FOR A PORTABLE MOBILE TERMINAL

(71) Applicant: AUDI AG, Ingolstadt (DE)

(72) Inventor: Holger Thiel, Wettstetten (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/076,404

(22) PCT Filed: Jan. 24, 2017

(86) PCT No.: PCT/EP2017/051351
§ 371 (c)(1),
(2) Date: Aug. 8, 2018

(87) PCT Pub. No.: WO2017/140462
PCT Pub. Date: Aug. 24, 2017

(65) Prior Publication Data
US 2019/0044563 A1   Feb. 7, 2019

(30) Foreign Application Priority Data
Feb. 15, 2016   (DE) .................. 10 2016 001 669

(51) Int. Cl.
*H04B 1/3883*   (2015.01)
*H04M 1/18*   (2006.01)
(Continued)

(52) U.S. Cl.
CPC .......... *H04B 1/3883* (2013.01); *H02J 7/0044* (2013.01); *H02J 7/025* (2013.01);
(Continued)

(58) Field of Classification Search
None
See application file for complete search history.

(56) References Cited

U.S. PATENT DOCUMENTS

| 3,735,232 A * | 5/1973 | Fister ............ H01M 10/46 320/110 |
| 2009/0121685 A1* | 5/2009 | Eto ............... H01M 10/443 320/152 |

(Continued)

FOREIGN PATENT DOCUMENTS

| CN | 202818397 U | 3/2013 |
| CN | 204559644 U | 8/2015 |

(Continued)

OTHER PUBLICATIONS

International Preliminary Report on Patentability directed to related International Patent Application No. PCT/EP2017/051351, dated May 15, 2018, with attached English-language translation; 11 pages.

(Continued)

*Primary Examiner* — Mohammed Rachedine
(74) *Attorney, Agent, or Firm* — Sterne, Kessler, Goldstein & Fox, PLLC

(57) ABSTRACT

The invention relates to a protective case apparatus for a mobile terminal, having a case base body having a baseplate region for covering a rear of the terminal. The baseplate region has an abutment area for abutting the rear of the mobile terminal. The case base body also has side walls that are integrally molded on the baseplate region and are each configured to directly abut a respective narrow side of the mobile terminal and thereby to hold the mobile terminal against the abutment area. The case base body has only three side walls and one short side of the abutment area is without a wall. When the mobile terminal is arranged in the protective case apparatus, a narrow side of the mobile terminal that is arranged on the short side is not covered by the case base body.

8 Claims, 6 Drawing Sheets

(51) Int. Cl.
*H02J 7/02* (2016.01)
*H02J 50/10* (2016.01)
*H04B 1/3888* (2015.01)
*H02J 7/00* (2006.01)
*H04B 1/3822* (2015.01)

(52) U.S. Cl.
CPC ............ *H02J 50/10* (2016.02); *H04B 1/3822* (2013.01); *H04B 1/3888* (2013.01); *H04M 1/185* (2013.01)

(56) References Cited

U.S. PATENT DOCUMENTS

| | | |
|---|---|---|
| 2014/0021909 A1 | 1/2014 | Klawon et al. |
| 2014/0035511 A1 | 2/2014 | Ferber et al. |
| 2015/0054462 A1* | 2/2015 | Weidinger ................ B60L 3/04 320/109 |
| 2015/0077047 A1 | 3/2015 | Chen |
| 2015/0148093 A1 | 5/2015 | Huang et al. |
| 2015/0229155 A1 | 8/2015 | Sporck et al. |
| 2015/0363988 A1 | 12/2015 | Van Wiemeersch et al. |
| 2017/0133862 A1* | 5/2017 | Jung ................ H01M 10/4257 |

FOREIGN PATENT DOCUMENTS

| | | |
|---|---|---|
| DE | 102015108867 A1 | 12/2015 |
| WO | WO 2014/037676 A1 | 3/2014 |
| WO | WO 2015/156836 A1 | 10/2015 |

OTHER PUBLICATIONS

English-language abstract of Chinese Patent Application Publication No. 202818397 U, published on Mar. 20, 2013; 1 page.
English-language abstract of International Patent Application Publication No. 2014/037676 A1, published on Mar. 13, 2014; 2 pages.
English-language abstract of Chinese Patent Application Publication No. 204559644 U, published on Aug. 12, 2015; 1 page.
International Search Report and Written Opinion of the International Search Authority directed to related International Patent Application No. PCT/EP2017/051351, dated Apr. 5, 2017, with attached English-language translation of the International Search Report and Parts V, VII, and VIII of the Written Opinion; 16 pages.
Written Opinion of the International Search Authority directed to related International Patent Application No. PCT/EP2017/051351, dated Jan. 11, 2018, with attached English-language translation of Parts I, VII, and VIII of the Written Opinion; 5 pages.

\* cited by examiner

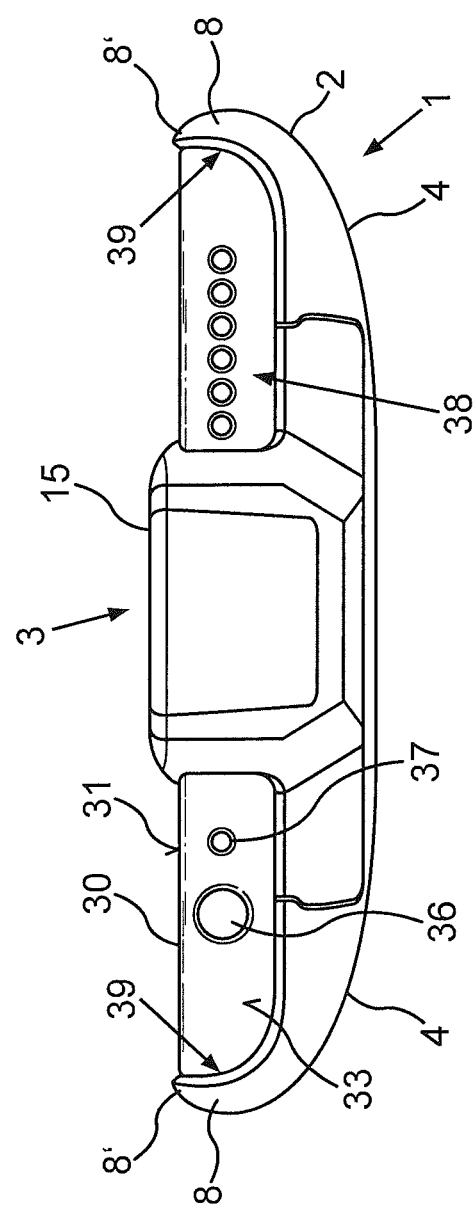

PROTECTIVE CASE APPARATUS WITH TEMPERATURE-CONTROLLED CHARGING CIRCUIT FOR A PORTABLE MOBILE TERMINAL

TECHNICAL FIELD

The present invention refers to a protective case apparatus for a portable mobile terminal, such as a smartphone. The terminal may be introduced into the protective case apparatus, so that a rear of the terminal and narrow sides thereof may be protected against corner bumping or scratching, for example. In contrast, a front of the terminal, which may for example be provided with a touchscreen (tactile display), is free for manipulation.

BACKGROUND

A protective case is disclosed in US 2014/0021909 A1, for example. This protective case apparatus is provided with a baseplate region for covering the rear of the terminal, and on the sides of this region side walls are molded, which form a frame, in which the terminal may be introduced. In the region of the baseplate an inductive charging device is integrated, in order to inductively charge the terminal. A disadvantage in such a protective case apparatus is that the frame formed by the side walls, which covers the narrow sides of the terminal, is frequently so thick, that the terminal is prevented from being inserted into the corresponding holding devices, so called cradles (base station, cradle). Moreover, connectors cannot always pass through openings in the side walls and completely enter connection sockets of the terminal. Finally, such side walls also obstruct the outputs to loudspeakers.

US 2015 0077047 A1 discloses a protective apparatus which may only be connected to the rear of a terminal. In this protective apparatus an inductive charging system is also integrated for charging the terminal. A drawback of this device is that it does not protect the narrow sides of the terminal.

WO 2015/156836 A1 is a two-part protective case apparatus. A thin walled protective case may be firmly connected to the terminal. This protective case also has rail elements, through which the thin walled protective case together with the terminal may be inserted into a larger protective case, which in turn for example may have a charging device for the terminal. The larger protective case surrounds the terminal only partially, since the protective function is already provided by the tightly applied thin protective case. A drawback of this configuration is that the tightly adhering thin protective case may further prevent the connection between the terminal and additional apparatuses, such as said cradle. Moreover, due to the side walls of the thin walled protective case loudspeakers may be negatively influences and/or connector ports may not be accessible for all connector types.

US 2014/0 035 511 A1 discloses a battery housing, which is adapted for charging a mobile apparatus housed in the same. The housing has a rear region having a side wall and a charging connector, which is supported in the housing and has a flexible cable. The case part of the two-part battery housing protects the mobile device even when the battery part of the housing has been removed.

CN 202818397 U shows a signal-enhancing protective case for an Apple® mobile phone. The protective case has a C-shaped protective case apparatus, wherein the rear plate is connected to clamping arms. The clamping arms are provided with reinforced holes. The protective case is adapted for exchanging signals of the mobile phone.

WO 2014/037 676 A1 shows a module for a wireless charging, which may be integrated into the protective case of a mobile terminal, an apparatus which connects the power supply connector of the mobile terminal, an induction coil which controls the current generated by the induction coil. The baseplate region has an insertion compartment, in which a plug-in element may be inserted.

CN 204559644 U shows a case for wireless charging of a mobile terminal. It comprises a case, a circuit board for wireless charging and a connector. The protective case is provided with a gap. The board for wireless charging has a contacting bracket, which exits into the gap.

US 2015/0 148 093 A1 discloses a housing for a mobile apparatus, which provides an additional battery capacity and additional storage space for the mobile apparatus. Data may be transferred from the mobile apparatus to the storage and from the storage to the mobile apparatus.

DE 10 2015 108 867 A1 discloses a system for remote communication with a vehicle, by using a mobile communication device and a case connected to the mobile communication device. The case comprises a transmitter/receiver, which allows a communication between the mobile communication device and the vehicle. The method provides a display/GUI, which shows to the user a vehicle trailer comprising the closing button, the opening button, the button for remote start, the button for opening the trunk and an alarm button. The user provides through the GUI trailer commands to the vehicle.

US 2015/0229155 A1 discloses an electrical circuit for controlling the outer case temperature of an electronic apparatus. A thermal sensor is positioned on the housing of a mobile portable apparatus and is coupled to a battery charger, which has an electrical circuit for limiting current. When the temperature of the housing exceeds a threshold, then the current limitation is reduced, so that the current of the battery charger is reduced.

BRIEF DESCRIPTION OF THE DRAWINGS/FIGURES

FIG. 6 illustrates a schematic representation of the protective case apparatus with an inserted terminal, where a narrow side of the terminal, which is not covered by the case base body, is shown having an applied plug-in element of the plug-in element, according to one embodiment of the disclosure.

DETAILED DESCRIPTION

Figure 1:
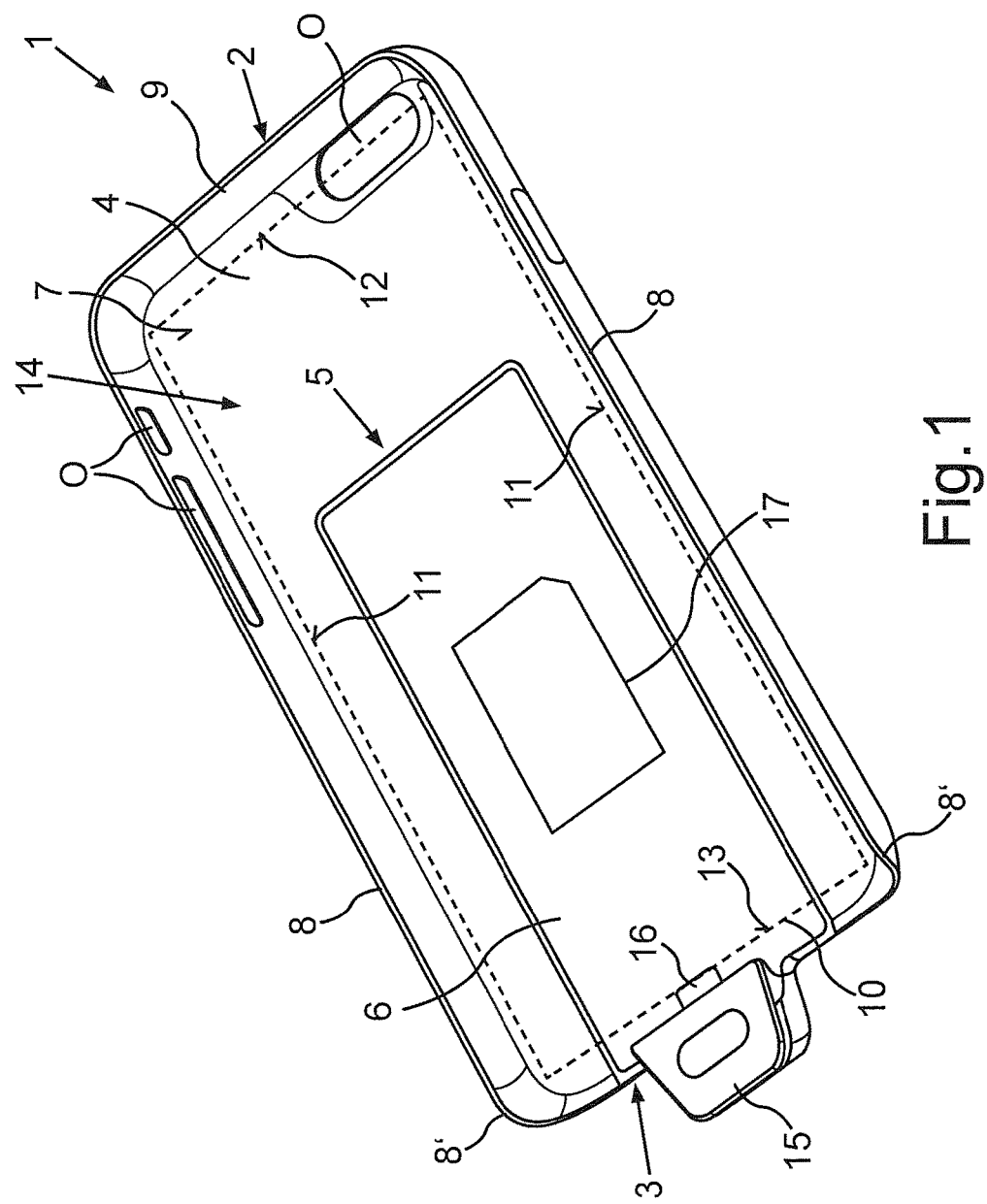
FIG. 1 illustrates a schematic representation of the protective case apparatus with a case base body and a plug-in element, according to one embodiment of the disclosure.

The object of the present invention includes providing a portable protective case for a portable mobile terminal and in providing an auxiliary electronics for charging the battery of the terminal.

This object is obtained by the subject matter of the claims. Advantageous developments of the invention are disclosed by the characteristics of the claims, the following description and the figures.

The invention provides a protective case apparatus for a portable mobile terminal. The terminal may for example be a smartphone or a tablet PC (PC—personal computer). The actual protective case is formed by a case base body. The case base body has a baseplate region for covering a rear side of the terminal. In order to place the rear of the terminal on the baseplate region, it is provided with an abutment area. Moreover, the case base body has side walls, which are arranged on the baseplate region or are molded on the same or are adjacent to it and protrude from the abutment area and are respectively adapted to directly abut a respective narrow side of the terminal and to surround and thus hold the terminal on the abutment area. Due to the side walls, in a manner known per se, a frame is formed, in which the terminal is inserted or clipped. In the protective case apparatus, it is assumed that the terminal has a parallelepiped-base form, wherein the front side with the touchscreen and the opposite rear side have the largest surface areas. The smaller side surfaces of the parallelepiped base form are indicated here as narrow sides, which are four. They may be flat or curved. The abutment area of the case base body in the baseplate region corresponds with its outer profile to the rectangular base form of the rear of the terminal. Curvatures of the rear and/or of the narrow sides of the terminal may also be reproduced by curvatures of the rear and/or narrow sides of the case base body, in order to obtain in this way an adhesion of the abutment area or of the abutment areas of the side walls to the terminal. In other words, the abutment area and the side walls delimit, together a receiving volume for the terminal, in which the terminal may be inserted or pressed therein. The abutment surfaces and the side walls abut against the case of the terminal in particular in a direct way, without any interposed material.

In order to freely use the terminal also in the inserted condition, i.e. when it is disposed within the protective case apparatus, according to the invention, the case base body has three side walls. In particular, it has only three side walls. In other words, non-complete frame is formed, which covers all four narrow sides of the terminal. Two of the three side walls are positioned on a respective longitudinal side or long side of the abutment area. These cover, when the terminal is inserted, the respective narrow side of the same, in particular entirely, in order to hold the terminal on the abutment area. The third side wall is positioned on a first short side of the abutment area. In other words, one second short side which is opposite of the first short side of the abutment area is wall-less. If the terminal is positioned in the protective case apparatus, then a narrow side of terminal positioned on this second short side is thus not covered by case base body, since there the side wall is missing. If the terminal is thus used correctly and inserted into the protective case apparatus, then a narrow side of the terminal is not covered by a side wall, so that electrical connections there in place and/or a microphone input and/or a loudspeaker output are not damaged by the case base body. A further advantage of an unprotected narrow side of the terminal is that it may also be introduced in said cradle, such as of a charging device, without a side wall of the protective case apparatus possibly blocking this insertion.

According to the invention, the charging circuit has a temperature sensor and is adapted for setting a charging current provided to the terminal via the electric contacts depending on a temperature signal of the temperature sensor. In particular it is foreseen that the current of a charging current at a temperature over a temperature threshold value is smaller or is set smaller than at a temperature below the temperature threshold value. Thus, for example, a charging current, which is set below the temperature threshold value, in a region from 0.8 to 1.5 Ampere, in particular to 1 Ampere, may be set above the temperature threshold value to a value lower than 0.8 Ampere, for example to 500 mA. The temperature threshold value may for example be in the region from 40 to 50 degrees, for example to 45 degrees.

The invention also comprises optional developments, which provide additional advantages.

Two developments relate to the problem that due to the open narrow side, the terminal may slide out of the protective case apparatus at the second short side. The side walls hold the terminal fixedly on the baseplate region in all motion direction, in particular by frictional adhesion and/or form fit.

A development, to this end, consists in that the abutment area and/or a respective abutment region of the side wall, which, when the terminal is inserted, abut against the respective narrow side of the same, has a rubberized surface. In this way the adhesion by friction between the abutment area and/or the abutment region and on the other hand the surface of the mobile terminal, is generated, through which the terminal is held in the protective case apparatus.

A further development consists in that on both side walls provided on the long sides of the abutment area, their ends, which are facing the open second short side, are formed with a converging curvature. In other words, both side walls form a toothed form on the short side. In this way both ends form, when the terminal is inserted, a form fit for holding the terminal against a sliding out in the direction of the second short side.

According to a further aspect of the invention, the protective case apparatus is also provided with an additional part, which is called a plug-in element in this case. In this embodiment, in the baseplate area of the case base body, i.e. on the rear side of the terminal, an insertion compartment or recess is formed or provided. The plug-in element has an insertion region, which corresponds, entirely or partially to the form of this insertion compartment or is formed correspondingly to the insertion compartment. The plug-in element may thus be inserted through this insertion region into the insertion compartment. On the insertion region a plug-in element having electric contacts is positioned. If the plug-in element is inserted with its insertion region into the insertion compartment of the baseplate region, said plug-in element is positioned at the second short side of the abutment area. Thus, if a terminal is inserted into the protective case apparatus, then the plug-in element abuts against the open or uncovered short side of the terminal. The electric contacts touch preferably corresponding electric contacts of the terminal. In particular they then insert into a connection socket of the terminal. Due to this embodiment, the advantage is achieved, that in the plug-in element an additional electronics may be provided, which may be connected through the electric contacts to the terminal. Said insertion region may for example be formed by an injection molding process, through which the additional electronics may be injection molded with a polymer or a plastic material, thus providing the required corresponding form.

According to a development, the plug-in element has a charging circuit for charging a battery of the terminal. The charging circuit may thus charge, through the electric contacts, a battery of the terminal with electric energy.

In an embodiment, the plug-in element is provided for an inductive charging system with a secondary electrical coil, for generating an electrical voltage from a magnetic alternate field and the charging circuit is provided for providing this voltage to the electric contacts. Thus, the advantage is obtained, that the terminal may be brought with its protective case apparatus into a magnetic alternating field, and the alternating field may be used from the secondary electrical coil for generating an electrical voltage for charging the terminal.

According to an embodiment, in the plug-in element, an electric battery for storing electric energy is provided. The charging circuit is provided for providing electric energy to the electric contacts, so that it may be picked up from the terminal. A plurality of such plug-in elements may be provided and when the battery is discharged, by replacing the plug-in element, additional electric energy may be provided to the mobile terminal.

In an embodiment, the plug-in element has a data storage and a storage control circuit of the plug-in element is provided for exchanging, through the electric contacts, storage data between this data storage and the terminal. In this way, the plug-in element may be used as a replacement for an USB-stick (USB—universal serial bus). The plug-in element thus represents a storage expansion for a memory of the terminal.

According to an embodiment, a radio key device for wireless operating a locking system of a motor vehicle is provided in the plug-in element. Such a radio key device is known, per se, in the context of separate radio keys for a motor vehicle. A communication apparatus of the plug-in element is adapted for receiving through the electric contacts at least one control signal and then activating the radio key device. In this way the advantage is obtained, that a user of a motor vehicle is not required to transport a separate radio key and the terminal, i.e. two devices, but rather in the protective case apparatus both the terminal and the radio key device may be combined, thus requiring only one accessory. Due to the controlling by means of the at least one control signal from the terminal it is ensured that the radio key device cannot be used for unlocking a motor vehicle, when the plug-in element is the only one present, i.e. it gets lost. Through the control signal, for example, a release of the radio key device may occur, in that it occurs only for example depending on a PIN-code which is correctly input into the terminal (PIN—personal identification number).

A development of the invention consists in that the plug-in element has a NFC-communication device (NFC—near field communication) for a wireless near field communication. A payment control device of the plug-in element is adapted for performing, depending on a payment signal received through the electric contacts, a cashless payment transaction through the NFC-communication device. In this way the plug-in element may thus be used as a wireless payment card. The loss of the plug-in element can cause no misuse, since the plug-in element actually performs a payment process only depending on a payment signal of the terminal. The near field communication may be based, for example, on a RFID-technology (RFID—radio frequency identification) or a Bluetooth technology. The payment control device may be based on an integrated circuit for cashless payments, such as known in the context with debit or credit cards.

Figure 2:
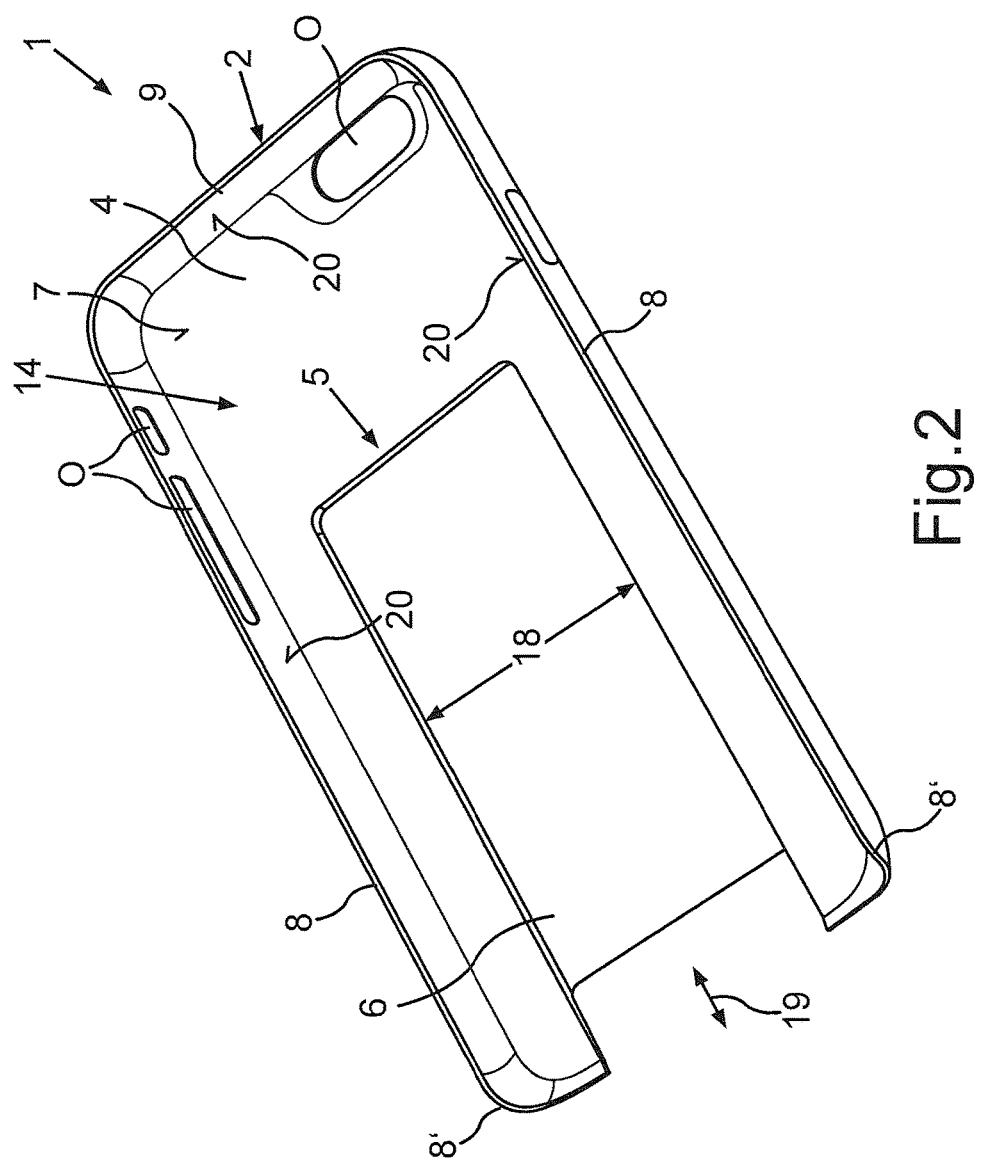
FIG. 2 illustrates a schematic representation of the case base body of the protective case apparatus of FIG. 1, according to one embodiment of the disclosure.
Figure 3:
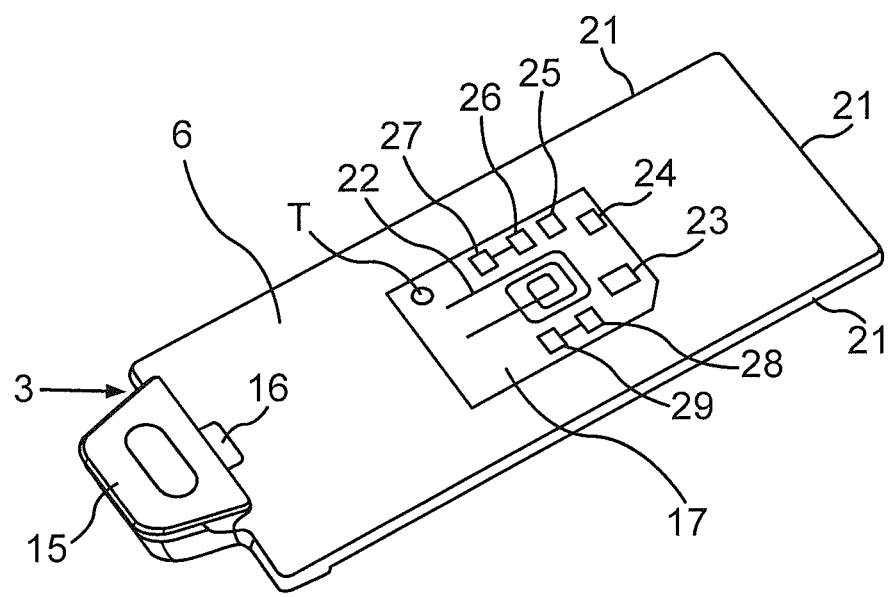
FIG. 3 illustrates a schematic representation of the plug-in element of the protective case apparatus of FIG. 1, according to one embodiment of the disclosure.
Figure 4:
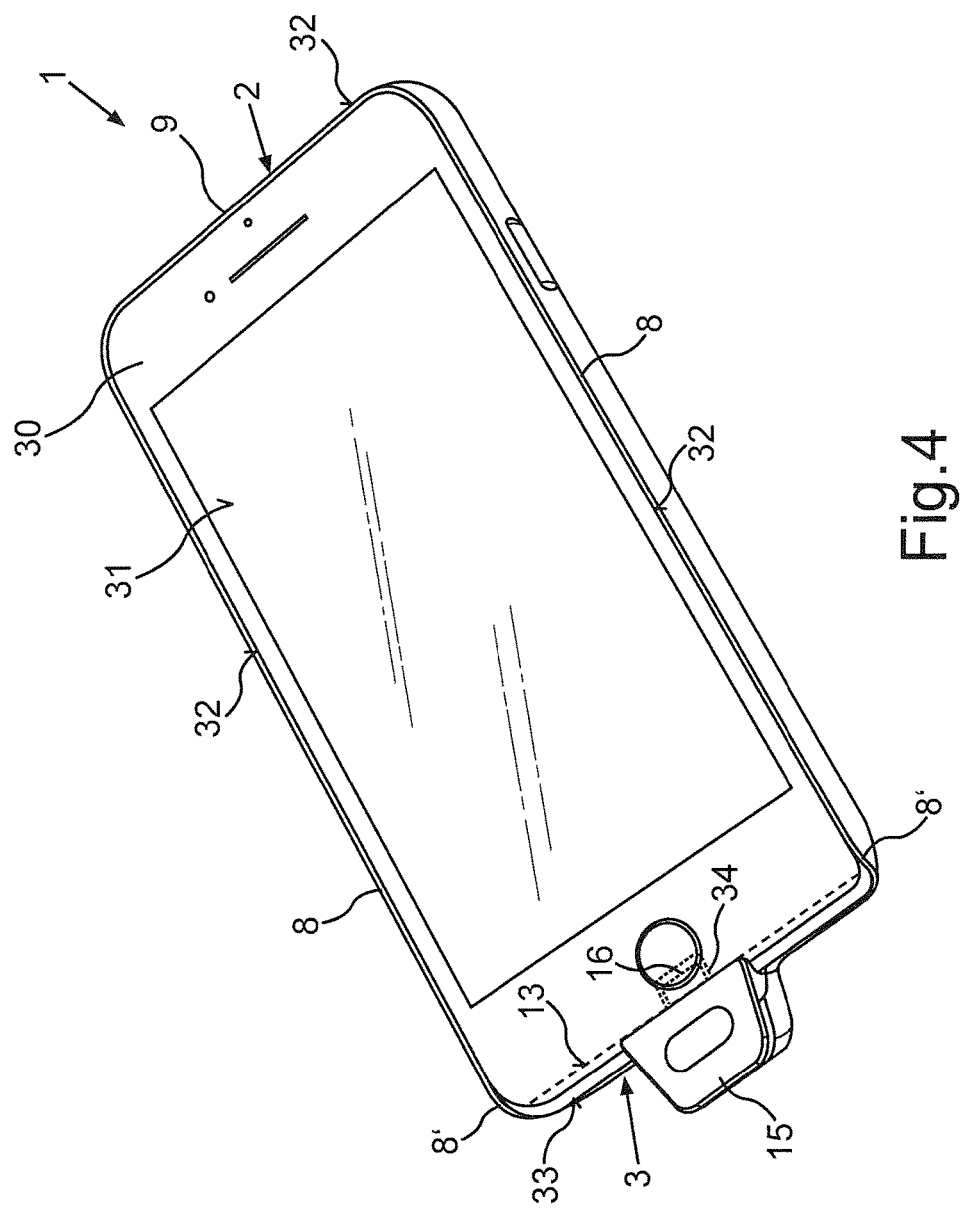
FIG. 4 illustrates a schematic representation of the protective case apparatus of FIG. 1 with an inserted mobile terminal, where a front side of the terminal is shown, according to one embodiment of the disclosure.
Figure 5:
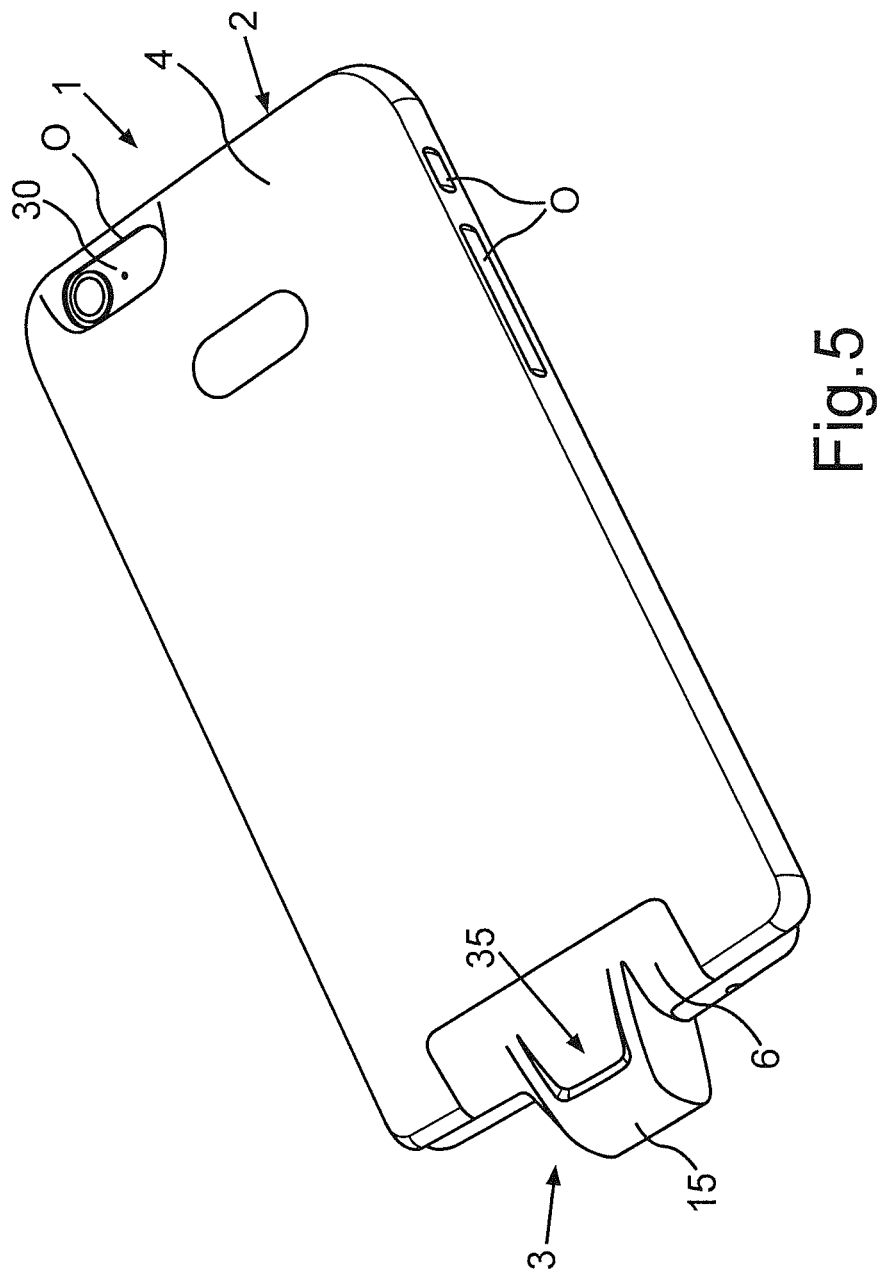
FIG. 5 illustrates a schematic representation of the protective case apparatus with an inserted terminal of FIG. 4, where a rear side opposite the front side is shown, according to one embodiment of the disclosure.

An exemplary embodiment of the invention will be described in the following. In particular:

FIG. 1 shows a schematic representation of an embodiment of the inventive protective case apparatus with a case base body and a plug-in element;

FIG. 2 shows a schematic representation of the case base body of the protective case apparatus of FIG. 1;

FIG. 3 shows a schematic representation of the plug-in element of the protective case apparatus of FIG. 1;

FIG. 4 shows a schematic representation of the protective case apparatus of FIG. 1 with an inserted mobile terminal, wherein a front side of the terminal is shown;

FIG. 5 shows a schematic representation of the protective case apparatus with an inserted terminal of FIG. 4, wherein a rear side opposite the front side is shown; and FIG. 6 shows a schematic representation of the protective case apparatus with an inserted terminal, wherein a narrow side of the terminal, which is not covered by the case base body, is shown having an applied plug-in element of the plug-in element.

The exemplary embodiment explained below is an exemplary embodiment of the invention. In the exemplary embodiment, the described components of the embodiment each represent individual features of the invention which are to be considered independently and which also independently develop the invention and thus have also to be considered individually or in a different combination than the combination shown as being part of the invention. Furthermore, the described embodiment can also be complemented by further features of the invention which are already described.

In the figures, functionally identical elements are each provided with the same reference numerals.

FIG. 1 shows a protective case apparatus 1, by which a mobile terminal, in particular a smartphone, may be protected against damage caused by bumping or scraping on a hard object. The protective case apparatus 1 can be configured in two parts and in this case, it has a case base body 2 and a plug-in element 3. The respective shape of the case base body 2 and of the plug-in element 3 can be produced, for example, by means of an injection molding process. The plug-in element 3 can be plugged into the case base body 2. The case base body 2 may in this case have a baseplate region 4, in which an insertion compartment 5 for inserting an insertion region 6 of the plug-in element 3 may be formed.

The case base body 2 may further comprise an abutment area 7, which may be brought into abutment with a rear side of a mobile terminal. As a result, the rear of the mobile terminal is covered or shielded or protected by the baseplate region 4 of the case base body 2. Adjacent to the abutment area 7, 4 side walls 8, 9 may be formed on the baseplate region 4. In this case, the abutment area 7 can have a rectangular basic shape 10 corresponding to a shape of the intended terminal and correspondingly have two opposite long sides 11 and a first short side 12 and an opposite second short side 13. Thus, there are two side walls 8 arranged on the long sides 11 and a third side wall 9, arranged on the first short side 12. The side walls 8, 9 stand perpendicular or obliquely from a plane of the abutment area 7 or protrude beyond this and thus are adjacent to a receiving volume 14 for inserting the terminal. The receiving volume 14 is thus surrounded by the side walls 8, 9. At the second short side 13, however, no side wall is provided or arranged. The receiving volume 14 is thus open to the second short side 13, as far as the case base body 4 is concerned. On the second short side 13, when a plug-in element 3 is inserted into the insertion compartment 5, a plug-in element 15 of the plug-in element 3 is positioned with electric contacts 16. The plug-in element 3 may then provide an additional electronics 17 for a terminal, which may be electrically contacted by the terminal through the electric contacts 16.

The case base body 4 may in this case be provided, as known, with openings O, in order to provide access to elements of the terminal even in the inserted condition of the element inside the protective case apparatus 1.

FIG. 2 shows the case base body 2 alone, i.e. the plug-in element 3 is removed from the insertion compartment 5. The insertion compartment 5 may, for example, have a rail device 18, through which the plug-in element guided along a plug-in direction 19 may be inserted into and extracted from the insertion compartment 5.

The abutment area 7 and/or contact regions or abutment regions 20 of the side walls 8,9 which, when the terminal is inserted, contact the same, may be rubberized. In this way a static friction between the terminal and the case base body 2 is increased with respect to a case base body having only non-rubberized plastic material.

Ends 8' of the side walls 8, which are arranged on the second short side 13, may be curved towards the abutment area 7, i.e. they may have a converging curvature.

FIG. 3 illustrates the plug-in element 3 alone. The plug-in element 3 can have rail elements or guide elements 21 at its insertion region 6, the shape of which correspond to the rail device 18 of the insertion compartment 5.

The additional electronics 17 may include, for example, an electrical secondary coil 22 for inductively generating an electrical voltage on the electrical contacts 16. Correspondingly, the additional electronics 17 also has a charging circuit 23 for providing the voltage to the contacts 16.

Additionally, or alternatively, an electrical accumulator 24 may be part of the additional electronics 17. Additionally, or alternatively, a data storage 25 may be provided in the additional electronics 17. Additionally, or alternatively, a radio key device 26 may be provided with a communication circuit 27 for coupling the radio key device 26 to the electrical contacts 16. Additionally, or alternatively, an NFC communication device 28 may be provided with a payment control device 29.

The charging device may, for example, be designed on the basis of the Qi standard.

For setting a charging current, a temperature sensor T may be provided for generating a temperature signal. As a result, the terminal can be protected from overheating during charging by the additional circuit 17.

By means of the charging device, a charging power of up to 3 Amperes at 15 W power can be realized.

FIG. 4 illustrates the protective case apparatus 1 with inserted terminal 30, which may be, for example, a smartphone. A front side 31 of the terminal 30 is accessible for operation and viewing. The side walls 8, 9 surround correspondingly shaped narrow sides 32 of the terminal 30 and hold this hereby at the abutment area 7. A narrow side 33 positioned at the second short side 13 is on the contrary not covered by the case base body 2. Only the plug-in element 15 of the plug-in element 3 abuts against the narrow side 33. The electric contacts 16 are inserted into a connection socket 34 of the terminal 30. The plug-in element 3 may be extracted from the insertion compartment 5, without having to extract the terminal 30 from the case base body 2. When the plug-in element 3 is removed or withdrawn, the narrow side 33 is freely accessible, so that the terminal 30 can be connected together with the case base body 2 on the narrow side 33, for example, to a cradle.

FIG. 5 shows how a rear of the terminal 30 is covered or protected by the baseplate region 4 of the case base body 2. The plug-in element 15 may be configured as a grip device for gripping the element 3 and in this example, it may have an engagement knob or engagement recess 35. With this, a pulling force of a user's fingers can be transmitted to the plug-in element 15.

FIG. 6 illustrates the narrow side 33 of the terminal 30. Through the wall-free or uncovered area on the short side 13, for example, a headphone jack 36 and/or a microphone 37 and/or a loudspeaker output 38 are free, i.e. they are not influenced by the case base body 2. The ends 8' of the side walls 8 form with an edge region 39 adjacent to the narrow side 33 a form fit, so that the terminal 30 may be protected against slipping out in the direction of the short side 13, i.e. along the insertion direction 19.

Thus, in conclusion, with the protective case apparatus 1 it is possible to provide a protective case with a wireless charging facility, in particular according to the Qi-Standard. A protective case for a smartphone or a mobile phone is provided, wherein a headphone connection, a microphone and/or a loudspeaker may be freely accessible, if they are positioned on the narrow side 33. Due to the described opening O, also a camera and operating elements may be freely accessible. The charging facility is integrated in the plug-in element 3, so that a simple extraction without disassembling the case base body 2 is possible, and thus, when the plug-in element 3 is extracted or removed, a direct and free access to the socket 34 for further applications.

The particular characteristic of this protective case apparatus 1 is thus that a microphone, a loudspeaker and a phone jack are freely accessible, in order to avoid a negative impact on the acoustic characteristics of the mobile terminal and to allow the use of any phone jack. Moreover, the actual charging electronics is mounted in a removable unit formed by the plug-in element 3, which allows the socket 34 to be freely accessible, without disassembling the case base body 2, in order to connect or use additional accessories. Due to the removable plug-in element 3, the charging electronics may also be replaced with an additional battery, which may be provided by a further plug-in element.

In conclusion, the example shows how through the invention a wireless-charging cover for a smartphone may be provided.

The invention claimed is:

1. A protective case apparatus for a mobile terminal, comprising:
   a case base body comprising:
      a baseplate region configured to cover a rear of the mobile terminal, wherein the baseplate region comprises an abutment area for directly abutting a rear of the mobile terminal; and
      side walls integrally molded on the baseplate region, the side walls protruding from the abutment area, and each configured to directly abut a respective narrow side of the mobile terminal and to surround the mobile terminal, and thereby, to hold the mobile terminal against the abutment area,
      wherein the side walls comprise three side walls, of which two are positioned on a respective long side of the abutment area and the third is positioned on a first short side of the abutment area,
      wherein a second short side opposite the first short side of the abutment area is configured without a wall, so that when the mobile terminal is arranged in the protective case apparatus, a narrow side of the mobile terminal is arranged on the second short side and is not covered by the case base body, and wherein the baseplate region comprises an insertion compartment; and a plug-in element comprising:
an insertion region at least partially formed in the plug-in element and corresponding to the insertion compartment, wherein the plug-in element is configured to be inserted into the insertion compartment using the insertion region, wherein the insertion region comprises an insertion element with electric contacts and when the insertion region is inserted in the insertion compartment, the insertion element is positioned on the second short side of the abutment area, and wherein the insertion element is configured to grip the plug-in element and comprises an insertion pit or insertion recess; and a charging circuit for charging an electric battery of the mobile terminal, wherein the charging circuit comprises a temperature sensor and is configured to set a charging current provided to the mobile terminal through the electric contacts depending on a temperature signal of the temperature sensor, such that a current value of a charging current at a first temperature above a temperature threshold is set smaller than at a second temperature below the temperature threshold.

2. The protective case apparatus of claim 1, wherein the abutment area or a respective abutment region of the side walls, which abuts against a respective narrow side of the inserted mobile terminal, comprises a rubberized surface.

3. The protective case apparatus of claim 1, wherein respective ends of two of the side walls positioned at the long sides facing the second short side are forming with a converging curvature such that when the mobile terminal is inserted, form a form fit for holding the mobile terminal against a sliding out in a direction of the second short side.

4. The protective case apparatus of claim 1, wherein:
the plug-in element further comprises an inductive charging system comprising a secondary electric coil configured to generate an electric voltage from a magnetic alternating field, and
the charging circuit is configured to provide the electric voltage to the electric contacts.

5. The protective case apparatus of claim 1, wherein:
the plug-in element further comprises an electric battery configured to store an electric energy, and
the charging circuit is configured to provide the electric energy to the electric contacts.

6. The protective case apparatus of claim 1, wherein the plug-in element further comprises:
a data storage; and
a storage control circuit configured to exchange, through the electric contacts, stored data between the data storage and the mobile terminal.

7. The protective case apparatus of claim 1, wherein the plug-in element further comprises:
a radio key device configured to wirelessly operate a locking system of a motor vehicle; and
a communication circuit configured to receive, through the electric contacts, at least one control signal and to subsequently activate the radio key device.

8. The protective case apparatus of claim 1, wherein the plug-in element further comprises:
a near field communication (NFC) device for a wireless near field communication; and
a payment control device configured to perform, depending on a payment signal received through the electric contacts, a cashless payment transaction via the NFC device.

* * * * *